(12) United States Patent
Von der Assen et al.

(10) Patent No.: US 8,069,818 B2
(45) Date of Patent: Dec. 6, 2011

(54) DRINKING TROUGH FOR ANIMALS AND WATER-COLLECTING BOWL FOR A DRINKING TROUGH FOR ANIMALS

(75) Inventors: Markus Von der Assen, Steinfeld (DE); Egon Schumacher, Barnstorf (DE)

(73) Assignee: Lubing Maschinenfabrik Ludwig Bening GmbH & Co. KG, Barnstorf (DE)

( * ) Notice: Subject to any disclaimer, the term of this patent is extended or adjusted under 35 U.S.C. 154(b) by 497 days.

(21) Appl. No.: 11/748,638

(22) Filed: May 15, 2007

(65) Prior Publication Data

US 2007/0272165 A1   Nov. 29, 2007

(30) Foreign Application Priority Data

May 29, 2006   (DE) .................... 20 2006 008 589 U

(51) Int. Cl.
*A01K 7/00*   (2006.01)

(52) U.S. Cl. .......................................... 119/74; 119/75

(58) Field of Classification Search ............... 119/19, 119/71, 72, 72.5, 74, 77
See application file for complete search history.

(56) References Cited

U.S. PATENT DOCUMENTS

| | | | | | |
|---|---|---|---|---|---|
| 2,154,345 | A | * | 4/1939 | Miller | 119/72.5 |
| 3,285,227 | A | * | 11/1966 | Mitchell | 119/61.1 |
| 4,185,590 | A | * | 1/1980 | Hostetler | 119/81 |
| 5,488,927 | A | * | 2/1996 | Lorenzana et al. | 119/51.5 |
| 5,660,139 | A | * | 8/1997 | Hostetler | 119/72.5 |
| 6,119,628 | A | * | 9/2000 | Lorenzana et al. | 119/77 |
| 6,230,653 | B1 | * | 5/2001 | Tobin | 119/72 |
| 6,644,241 | B2 | * | 11/2003 | Brown | 119/61.5 |
| 2005/0039691 | A1 | | 2/2005 | Jarke et al. | |
| 2006/0005776 | A1 | * | 1/2006 | Williams | 119/72.5 |

FOREIGN PATENT DOCUMENTS

EP   1 308 089 A2   5/2003
GB   587 919 A   5/1947

* cited by examiner

*Primary Examiner* — Joshua Michener
*Assistant Examiner* — Brian M O'Hara
(74) *Attorney, Agent, or Firm* — Laurence P. Colton; Smith Risley Tempel Santos LLC

(57) ABSTRACT

Drinking troughs for in particular poultry feature drinking valves arranged at regular intervals along a water supply line, with each drinking valve being assigned a water-collecting bowl (14). The water-collecting bowls (14) are usually made of plastic. The water-collecting bowls (14) are cleaned with agents that contain aggressive substances, which are capable of damaging the plastic of the water-collecting bowls (14). The invention is a water-collecting bowls (14) with a respective insert (17) made of a resistant material, thus making the water-collecting bowl (14) resistant to aggressive liquids, in particular cleansing agents.

16 Claims, 5 Drawing Sheets

DRINKING TROUGH FOR ANIMALS AND WATER-COLLECTING BOWL FOR A DRINKING TROUGH FOR ANIMALS

STATEMENT OF RELATED APPLICATIONS

This patent application is based on and claims international convention priority on German Patent Application No. 20 2006 008 589.0 having a filing date of 29 May 2006, which is incorporated herein in its entirety by this reference.

BACKGROUND OF THE INVENTION

1. Technical Field

The invention relates to a drinking trough for animals, in particular poultry, such as chickens, turkeys, ducks, geese, chicks or the like, with at least one drinking valve and a water-collecting bowl assigned to the at least one drinking valve. Furthermore, the invention relates to a water-collecting bowl for a drinking trough for animals with a dish part composed of plastic that has at least one cup-like depression for accommodating a store of liquid.

2. Related Art

Drinking troughs are employed to provide animals, in particular poultry, such as chickens, turkeys, geese, ducks as well as their chicks with the water they require. Such drinking troughs have at least one drinking valve which is assigned a water-collecting bowl. In the case of so-called linear drinkers, a plurality of drinking valves are arranged at regular intervals along an elongate water supply line, with each drinking valve being assigned a water-collecting bowl. Water discharged by the drinking valve that is not immediately drunk by the animals accumulates in the water-collecting bowl.

The water-collecting bowls are subject to only relatively minor mechanical loads. For that reason they are composed of a simple, inexpensive thermoplastic material, such as polypropylene.

Particularly in respect of hygienic considerations, it is necessary to clean each drinking trough at certain time intervals. Above all, the drinking troughs must be cleaned whenever there is a change of housing, for example when older animals are replaced by younger animals. Cleaning is in part carried out with cleaning agents which, particularly when a residual amount of cleaning fluid containing such cleaning agents remains in the water-collecting bowl, leads to a softening of the plastic of the water-collecting bowl. When the poultry then peck at the water-collecting bowl with their beaks, this results in permanent damages to the water-collecting bowl, in particular to a dish-shaped depression of same in which the liquid accumulates. In many cases, holes are pecked in the water-collecting bowl, thus rendering it unusable.

BRIEF SUMMARY OF THE INVENTION

The object of the invention is to propose a drinking trough for animals and a water-collecting bowl for such drinking troughs which, by employing simple means, is made resistant to aggressive liquids and damages inflicted by animals, in particular by the beaks of poultry.

A drinking trough that achieves this object is a drinking trough for in particular poultry, such as chickens, turkeys, ducks, geese, chicks or the like, with at least one drinking valve and a water-collecting bowl assigned to the at least one drinking valve, characterized in that the water-collecting bowl is formed from a dish part and at least one insert, which is made of a resistant material and connected to the dish part. By virtue of the insert it is possible to reinforce the water-collecting bowl in at least one position. In this case the insert is made of a robust material, which above all is permanently resistant to aggressive media, and in particular does not soften, so that in particular pecking animals (poultry) cannot damage the water-collecting bowl. According to the invention, it is not necessary to have the entire water-collecting bowl made of a more resistant, and thus more expensive, material. It is sufficient to have the insert extend only over a selected region of a dish part of the water-collecting bowl in which liquid containing aggressive agents remains over an extended period of time.

Also provided by the invention is that the insert is formed from a material that is more resistant to aggressive liquids than the synthetic material of the dish part of the water-collecting bowl. The dish part can thus be made of a simple, non-expensive plastic, in particular a thermoplastic material. Only the insert, which extends at least across a part of the dish part, needs to be manufactured from a more high-quality material.

In a preferred embodiment of the drinking trough, the insert is disposed in the dish part, preferably extending only across a lower section of the dish part. By virtue of the arrangement of the insert in the dish part, the insert collects the liquid which accumulates in the dish part of the water-collecting bowl or the liquid that remains there after the drinking trough has been cleaned. The insert thus protects the dish part from aggressive media, in particular aggressive liquids. Sufficient protection is provided if the insert extends only across a lower region of the dish part because the liquid, and above all the residual liquid, accumulates in this lower part of the water-collecting bowl.

The invention also provides for arranging the insert on an inner side of the dish part and to be connected thereto. By connecting the insert with the inner side of the dish part, the region of the dish part surrounding the insert on the outside is protected against aggressive media, in particular washing liquids or cleaning agents. Preferably the outer side of the insert is connected over its full surface to the inner side of the dish part. This can be accomplished by full-surface adhesive bonding, but expediently also by injection molding around the outer side of the insert with the plastic of the dish part during the production of the water-collecting bowl. This ensures complete sealing between the outer side of the insert and the inner side of the dish part, thus preventing any liquids, in particular those containing aggressive agents, to pass along the outer side of the insert and reach that part of the dish part to be protected by the insert, and possibly damage, in particular soften, the dish part.

Pursuant to a preferred further development of the invention, the dish part has a cup- or beaker-like depression for the purpose of collecting a store of water, with the insert being configured in a manner corresponding to the depression, that is to say, also having a cup- or beaker-like shape. It is sufficient for the insert to extend only across a lower part of the cup-like depression of the dish part, although the insert may, if necessary, also extend across the inner side of the entire cup-like depression of the dish part. The cup-like insert forms an inner double wall of the cup-like depression, protecting the latter where, as experience has shown, aggressive media remain in the depression over an extensive period of time. The insert is dimensioned to correspond to the anticipated top level of the aggressive liquid remaining in the water-collection bowl in that the insert extends only above such a lower region of the cup-like depression of the dish part of the water-collecting bowl in which the maximum level of residual liquid, in particular the maximum level of residual cleaning liquid, remains. The insert thus only needs to extend above the necessary part of the cup-like depression. It should also be noted that the cup-like depression, like the remainder of the dish part, is made of plastic which does not need to be resistant to aggressive media.

It is preferably provided that the lower part of the depression of the dish part in the region of the insert is provided with a wall thickness that is reduced by an amount corresponding to the wall thickness of the insert. The overall wall thickness of the depression in the region of the insert is then approximately just as thick as the wall thickness of the depression or of the dish part above the insert. This allows the inner side of the insert to be approximately flush with the inner side of the depression or of the dish part above the insert, thus providing an essentially seamless transition from the insert to the dish part of the water-collecting bowl and essentially avoiding the formation of offsets upon which residues or dirt might accumulate.

It is usually sufficient for the insert to extend only over approximately a lower fifth to the lower half of the overall depth of the cup-like depression of the water-collecting bowl. Based on practical experience, aggressive liquids, in particular residues of cleaning fluids, accumulate only in a lower part of the cup- or beaker-like depression, thus filling up only a part of the latter.

The wall thickness of the insert in the region of the cup-like depression is approximately one-fourth to one-half, preferably approximately one-third of the wall thickness of the water-collecting bowl. The insert therefore has only a relatively small wall thickness. When the appropriate materials are employed for the insert, such a wall thickness is sufficient for protecting the plastic of the dish part. Due to its small wall thickness, the insert can be economically manufactured even though it is made of relatively high-quality material. In addition, such a thin-walled insert can be well integrated in the dish part because the thickness of the dish part, in particular in the region of the insert, must only be slightly altered in order to embed the insert to be flush in the cup-like depression of the water-collecting bowl without having to increase the wall thickness in the region of the insert.

Suitable materials for the respective insert are steel, preferably stainless steel or rust-free steel, but aluminum or ceramics may also be employed. In addition, it is possible to have the insert made of a chemical-resistant, in particular lye- and/or acid-resistant plastic. Even if these materials are high-quality goods, they do not result in any appreciable additional costs of the water-collecting bowl because the insert has thin walls, for one, and for another, it extends only across the region of the cup-like depression of the water-collecting bowl in which residues of the cleaning agents remain after the drinking troughs have been cleaned. The insert therefore does not have to extend over the entire inner wall surface of the cup-like depression of the water-collecting bowl but instead only over a funnel-shaped tapered lower region having a relatively small surface area.

A water-collecting bowl for achieving the object stated at the outset is a water-collecting bowl for a drinking trough for animals which a dish part composed of plastic that has at least one cup-like depression for accommodating a store of liquid, characterized in that the dish part is assigned at least one insert made of a more resistant material. Accordingly, it provides that the dish part of the water-collecting bowl is assigned at least one insert or even one inlay made of a resistant material. The insert or the inlay protects the remaining dish part against aggressive media, for example washing or cleaning agents. For that reason, the dish part otherwise does not need to be resistant against such aggressive substances. In this manner, the water-collecting bowl is provided with a protective, inner double wall on site, namely where it is actually needed. Thus, the entire dish part of the water-collecting bowl can be made of a non-expensive material, preferably plastic.

Further embodiments of the water-collecting bowl correspond to individual or a combination of previously explained features of the drinking trough. Reference is hereby made as such.

BRIEF DESCRIPTION OF THE DRAWINGS

A preferred exemplary embodiment of the invention will be explained in more detail below with the help of the drawing, which shows.

DETAILED DESCRIPTION OF PREFERRED EMBODIMENTS

Figure 1:
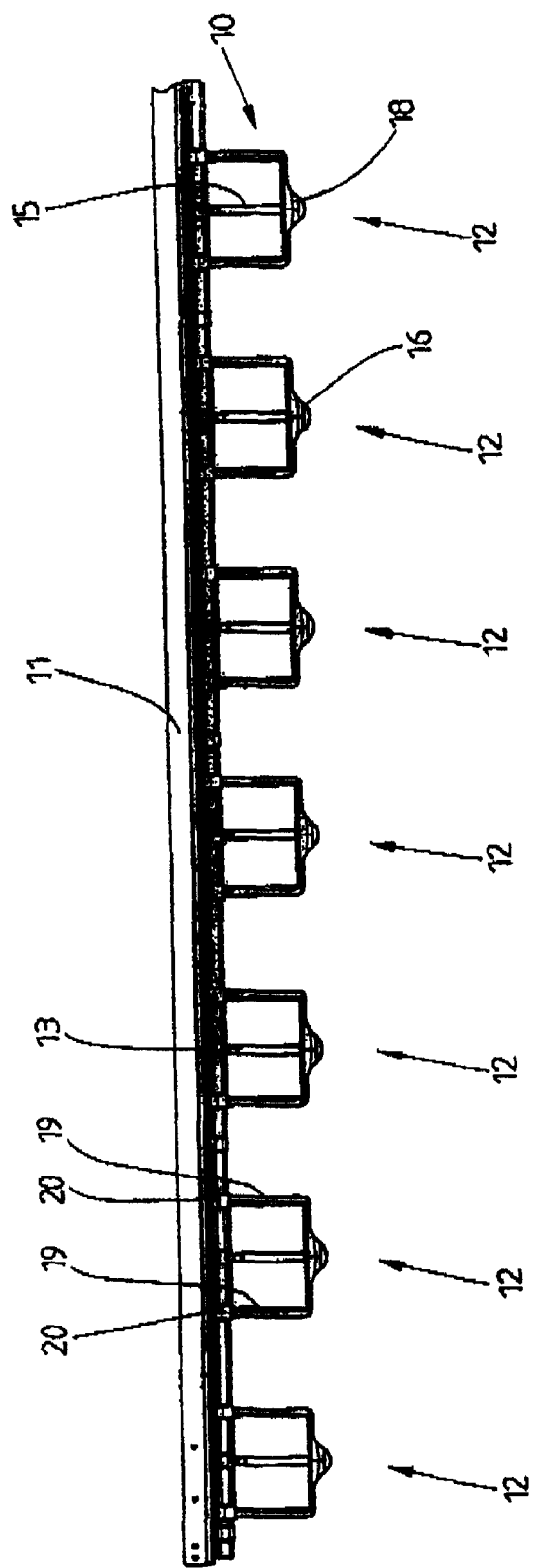
FIG. 1 is a side view of one section of a drinking trough for animals.
Figure 2:
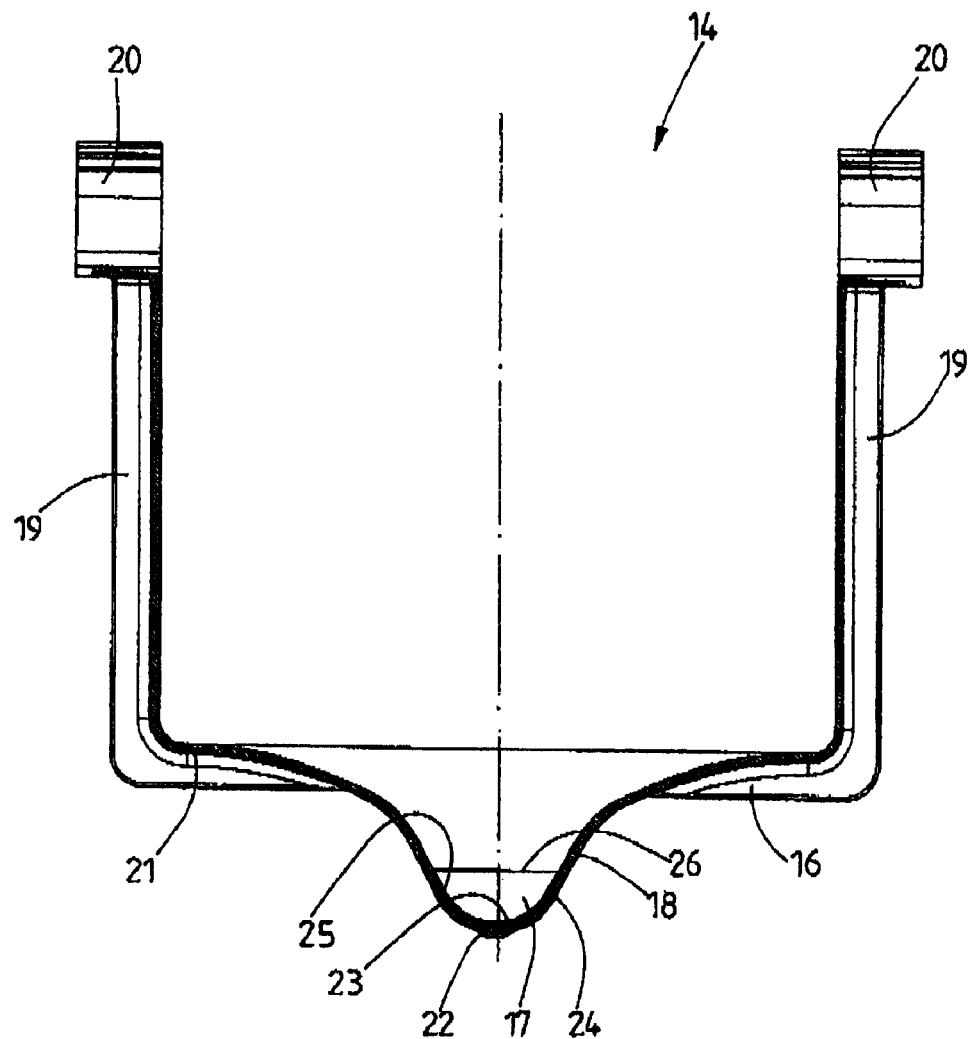
FIG. 2 is a vertical sectional view of a water-collecting bowl of the drinking trough of FIG. 1.
Figure 3:
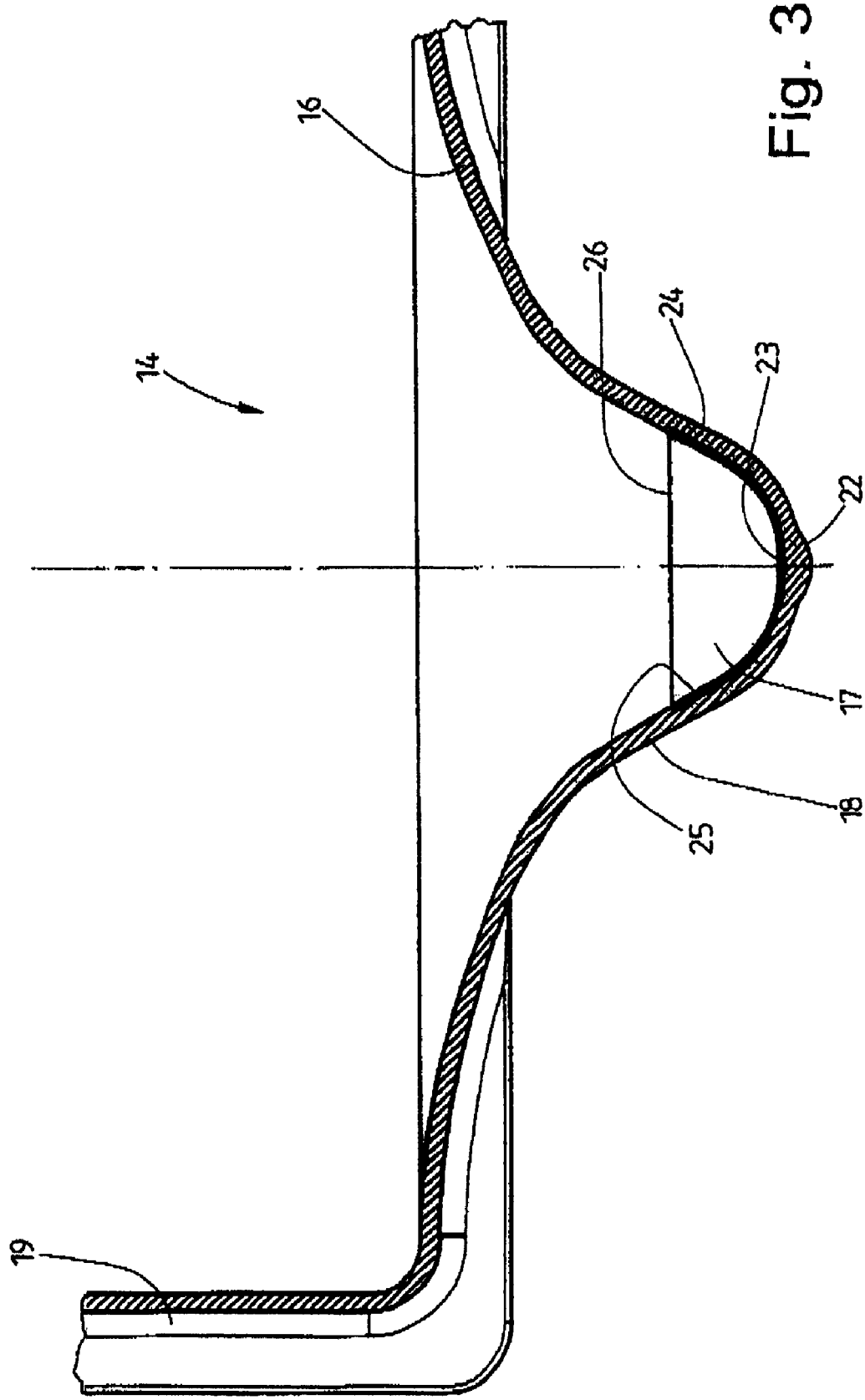
FIG. 3 is an enlarged detail of the water-collecting bowl of FIG. 2.
Figure 4:
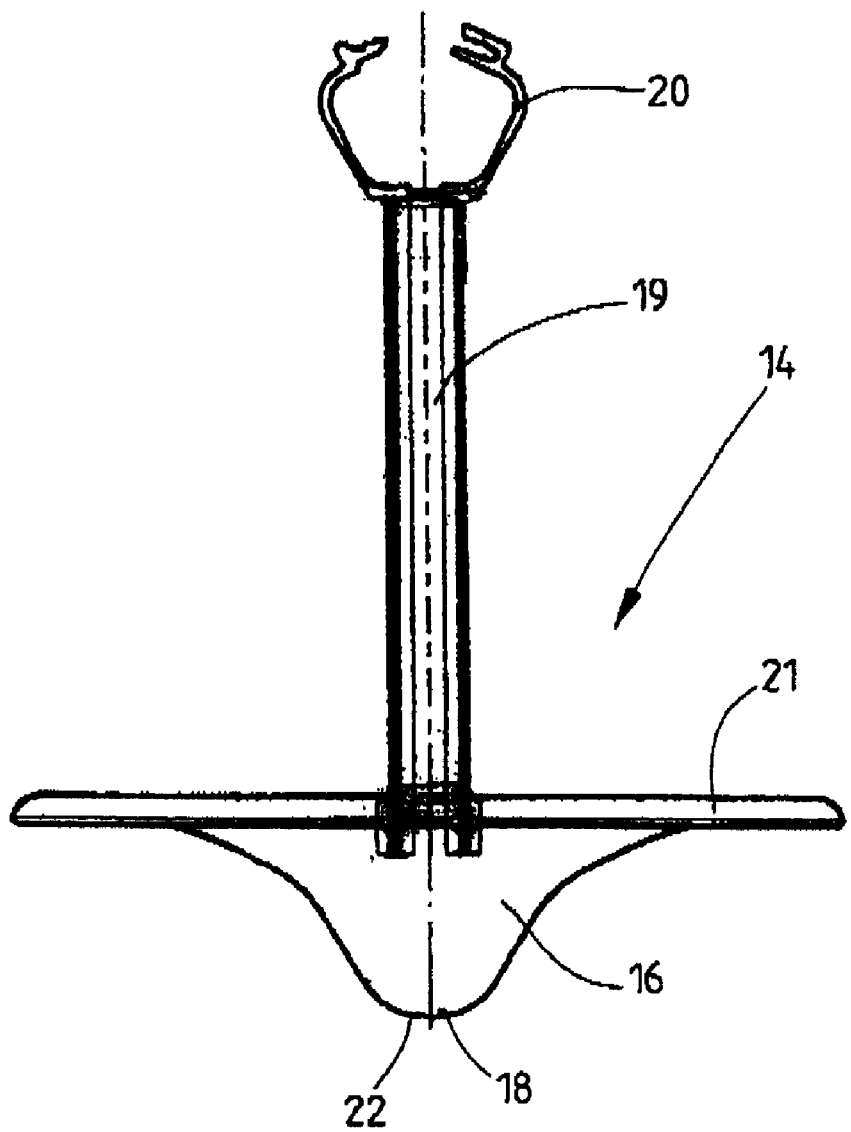
FIG. 4 is a side view of the water-collecting bowl of FIGS. 2 and 3.

Shown in the figures is a drinking trough for animals that is designed as a so-called linear drinker for floor management systems in poultry raising. This linear drinker allows all kinds of poultry, in particular including chicks, to cover their water requirements on their own. The invention is not only suitable for the shown linear drinker but can be employed in all types of drinking troughs for animals, inasmuch as these have at least one water-collecting bowl.

The drinking trough (linear drinker) shown in the figures has an elongate, tubular water supply line 11. The water supply line 11 is provided with a plurality of spaced drinking positions 12, which in the present case have an identical configuration. The water supply line 11 is hung on support wires, assuming a horizontal or slightly inclined orientation at the appropriate (short) distance above the ground.

Inserted from below in the water supply line 11 of the linear drinker shown here are drinking valves 13 placed at regular intervals. These are known drinking valves 13 with a housing having in part an external thread for screwing into a corresponding tapped bore of the water supply line 11. The preferably identically configured drinking valves 13 have a valve pin that partially projects from the bottom of the housing. The lower end of the valve pin projecting from the housing is freely accessible to the animals, in particular to their beaks. The respective drinking valve 13 can be opened by lifting and/or tilting the valve pin, thus allowing water provided by the water supply line 11 to the drinking valves 13 to be discharged from the bottom of the drinking valves 13 in metered quantities.

Each drinking position 12 has, in addition to the drinking valve 13, a water-collecting bowl 14. The identically configured water-collecting bowls 14 of all drinking positions 12 in the shown exemplary embodiment are centered below and at a distance from the drinking valves 13.

In the case of the linear drinkers shown in the figures, each drinking position 12 has an actuating tube 15, which is pivotably connected to the water supply line 15 and which extends to the water-collecting bowl 14. The actuating tube 15 is coupled to the valve pin of the respective drinking valve 13 in such a manner that a tilting of the actuating tube 15 opens the drinking valve 13 and in this manner causes water to flow through the actuating tube 15 from the drinking valve 13 into the water-collecting bowl 14. However, the invention is not limited to linear drinkers having a actuating tube 15 at each drinking position 12. Rather, the invention also relates to linear drinkers which have no actuating tube 15 between the respective drinking valve 13 and the water-collecting bowl 14 but instead in which the water flows directly from the drinking valve 13 into the water-collecting bowl 14 located directly below it.

The invention provides for a special configuration of the water-collecting bowls 14 of the shown linear drinker. Accordingly, the invention is not directed exclusively to the shown linear drinker but can be applied to all types of animal drinkers, for example those having only one drinking position 12 and also only one water-collecting bowl 14.

Figure 5:
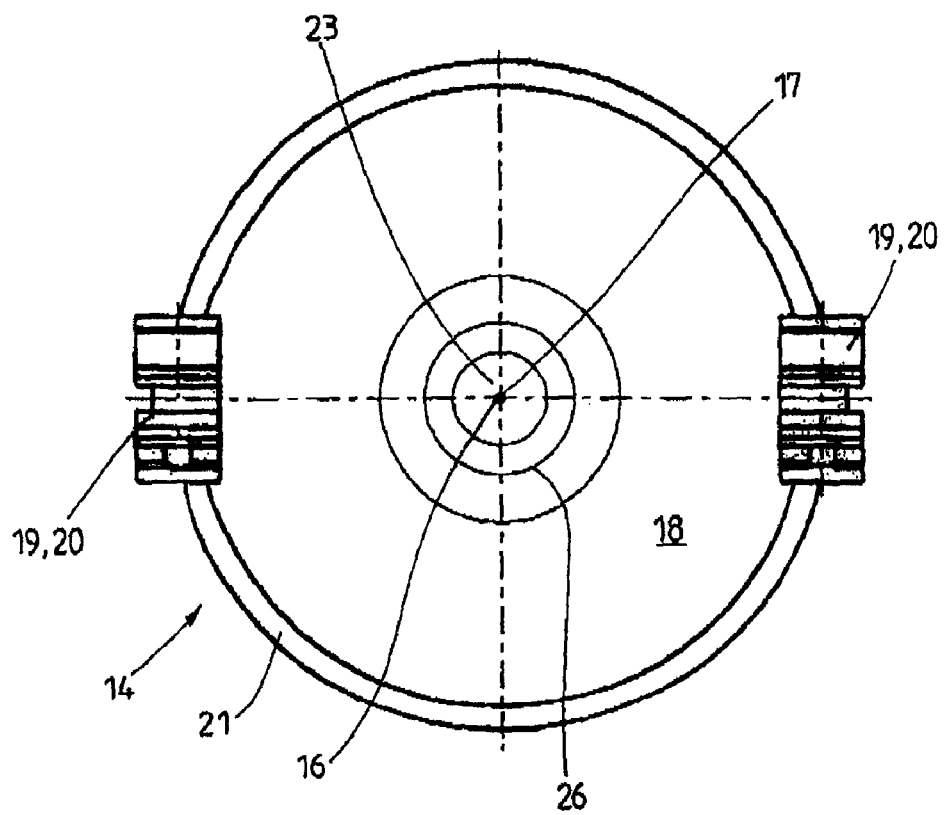
FIG. 5 is a top view of the water-collecting bowl of FIGS. 2 to 4.

The water-collecting bowl 14 shown in FIGS. 2 to 5 has a dish part 16 and an insert 17. The dish part 16 is configured as a single piece comprising a trough- or cup-like depression 18 for receiving a store of water, two parallel support arms 19 and a clip fastener at the top end of each support arm 19. The entire dish part 16, that is, the depression 18, the support arms 19 and the clip fasteners, 20, are made of a thermoplastic material, preferably polypropylene, specifically by injection molding In the water-collecting bowl 11 shown here, the cup-like depression 18 has a rotationally symmetric configuration with a circular edge 21 (FIG. 5). The cup-like depression 18 tapers downward in an approximately conical shape in the direction of its slightly concave bottom 22. But the depression 18 can also assume other shapes as desired, in particular noncircular outlines, such as those having an oval edge, and have cross sections of different shapes. Arranged at opposite sides of the edge 21 of the depression 18 are parallel support arms 19 that are oriented approximately vertically with respect to the edge 21 and at a distance from the latter. As an alternative, the water-collecting bowl can have only a single support arm. The identically configured clip fasteners 20 at the upper ends of the support arms 19 are employed for the detachable connection of the water-collection bowl 14 to the water supply line 11. The respective closed clip fastener grips around the water supply line 11.

According to the invention, the insert 17 is arranged in the dish part 16 of the water-collecting bowl 14. In particular, water-collecting bowls having a plurality of depressions 18 can have a plurality of inserts.

In the shown exemplary embodiment the insert 17 is disposed in the depression 18. The insert 17 is located in the region of the bottom 22 of the depression 18 and extends over only a part of the inner side of the side wall of the depression 18 that proceeds from the bottom 22, specifically over a lower part. The insert 17 has a contour that corresponds to that part of the depression 18 to which the insert 17 is assigned. In the area where the insert 17 is located in the depression 18, the wall of the depression 18 is reduced in thickness, specifically by an amount corresponding to the wall thickness of the insert 17, which, like the depression 18, has a rotationally symmetrical and cup-like shape. The entire wall thickness of the depression 18 is therefore approximately just as large in the region of insert 17 as it is in the region above the insert 17. The cup-like insert 17, like the depression 18, is provided with a closed bottom 23, which lies above the bottom 22 of the depression 18. The outer contour of the insert 17 therefore corresponds to the inner contour of the depression 18 in the region of the insert 17.

The insert 17 is connected over its entire surface to the inner side 25 of the depression 18. This connection is preferably made during the production of the water-collecting bowl 14 during the injection molding process in that the insert 17 is inserted in the injection mold before injection molding and with thermoplastic injection molding being applied around the insert in the injection mold to form the dish part 16. This results in a permanent, deep connection of the outer side 24 of the insert 17 to the inner side 25 of the depression 18 so that no liquid can enter between the insert 18 and the depression 18. As an alternative, the insert 17 can be glued in the depression. In such a case, the wall thickness of the depression 18 does not have to be reduced in the region of the insert 17, with the result that the water-collecting bowl 14 has a wall thickness in the region of the insert 17 that is enlarged by the thickness of the insert, thus forming an upper edge 26 of the insert 17 and not, as clearly illustrated in FIG. 3, having a seamless transition to the upper region of the depression 18 lying above the insert 17.

In the shown exemplary embodiment, the insert 17 is associated with only a lower part of the depression 18 in that the insert 17 extends only across approximately a lower third of the overall depth of the depression 18. If required, however, it is possible for the insert 17 to be higher, so that it extends over one-half to three-fourths of the height of the depression 18. It is also conceivable to design the insert 17 to occupy a lower position in which it extends over only one-fifth of the height of the depression 18. The wall thickness of the insert 17 is approximately one-fourth to one-half of the wall thickness of the depression 18 above the insert 17. Preferably the wall thickness of the insert 17 is approximately one-third of the wall thickness of the depression 18. For example, if the depression 18 outside of the region of the insert 17 has a wall thickness of 2.5 mm, the wall thickness of the insert 17 is only approximately 0.75 mm. But the wall thickness of the insert 17 can also be smaller, for example only 0.5 mm. Likewise, embodiments of the water-collecting bowl 14 are conceivable in which the insert 17 has a wall thickness of up to 1 mm.

A particularly suitable material for the insert 17 is stainless steel. But in addition, any other type of high-grade steel or common black steel is also conceivable. Aluminum or a ceramic material is also a suitable material for the insert 17. Finally, it is also conceivable to compose the insert 17 from a chemical-resistant plastic, in particular a plastic that is resistant to lye and/or acid.

By employing at least one insert 17 in the dish part 16 of the water-collecting bowl 14 it is possible to keep aggressive substances, such as liquids containing cleaning agents, and above all residual liquid remaining in the water-collecting bowl after cleaning, from softening the thermoplastic material of the water-collecting bowl 14. The residual liquid remaining in the depression 18 of the respectively larger water-collecting bowl 14 after cleaning of the water-collecting bowl 14 or of the drinking trough usually accumulates only in the insert 17, with the insert 17 having such a height that the remaining residual liquid in the depression 18 does not reach a level above the region of the insert 17. Since the insert 17 is manufactured from the aforementioned materials that are particularly resistant to aggressive substances, the residual liquid remaining only in the region of the insert 17 can no longer soften the plastic of the dish part 16. This eliminates the risk of animals damaging or even puncturing above all the depression 18 of the water-collecting bowl 14 with their beaks because according to the invention this is prevented by the insert 17, which is resistant to aggressive substances.

The invention is suitable for use with water-collecting bowls of all kinds and sizes as well as for any other type of animal drinkers having at least one water-collecting bowl and not limited to only the linear drinker shown here.

LIST OF DESIGNATIONS 10 drinking trough
11 water supply line
12 drinking position
13 drinking valve
14 water-collecting bowl
15 actuating tube
16 dish part
17 insert
18 depression
19 support arm
20 clip fastener
21 edge
22 bottom
23 bottom
24 outer side
25 inner side
26 upper edge

What is claimed is:

1. A drinking trough for poultry, the drinking trough having at least one drinking valve (13) and a water-collecting bowl (14) assigned to the at least one drinking valve (13), wherein
the water-collecting bowl (14) is formed from a dish part (16) and at least one insert (17), which is connected to the dish part (16), the dish part (16) being made of plastic and the insert (17) being made of a material that is more resistant to aggressive liquid than the plastic of the dish part (16),
the dish part (16) comprises an inner side and a depression (18) within the inner side of the dish part (16), the depression (18) having a contour,
the insert (17) having an inner side, an outer side, a wall thickness and being located in the depression (18), the outer side of the insert (17) being connected to the inner side of the dish part (16), and
the depression of the dish part has a lower part in the region of the insert (17), wherein a wall thickness of the dish part is reduced by an amount equal to the wall thickness of the insert (17) wherein the inner side of the insert (17) is flush with the inner side of the dish part (18) above the insert (17).

2. The drinking trough according to claim 1, wherein the insert (17) is arranged in the dish part (16) and extends only across a lower part of the dish part (16).

3. The drinking trough according to claim 2, wherein the insert (17) extends only across a lower region of the dish part (16).

4. The drinking trough according to claim 1, wherein the depression (18) is for accommodating a store of water and the insert (17) extends only across a lower region of the depression (18).

5. The drinking trough according to claim 4, wherein the outer side of the insert (17) has a contour that corresponds to the contour of the depression (18).

6. The drinking trough according to claim 4, wherein the insert (17) extends only across a lower part of the overall depth of the depression (18).

7. The drinking trough according to claim 4, wherein the insert (17) has a wall thickness that corresponds to approximately one-fourth to one-half of the wall thickness of the depression (18).

8. The drinking trough according to claim 1, wherein the insert (17) has a wall thickness between 0.5 mm and 1 mm.

9. The drinking trough according to claim 1, wherein the insert (17) is composed of steel.

10. The drinking trough according to claim 1, wherein the insert (17) is composed of a material selected from the group consisting of stainless steel, aluminum and ceramic.

11. The drinking trough according to claim 1, wherein the insert (17) is composed of a chemical-resistant plastic.

12. The drinking trough according to claim 1, wherein the outer side of the insert (17) is permanently connected over its full surface to the inner side of the dish part (16).

13. The drinking trough according to claim 4, wherein the outer side of the insert (17) is permanently connected over its full surface to the depression (18) on the inner side of the dish part (16).

14. A water-collecting bowl for a drinking trough for animals, the drinking trough having at least one drinking valve (13), the water-collecting bowl having a dish part (16) composed of plastic that has an inner side and at least one depression (18) on the inner side for accommodating a store of liquid, wherein:
the dish part (16) comprises at least one insert (17) made of a material that is resistant to the liquid,
the water-collecting bowl (14) is connected to the dish part (16),
the insert (17) has an inner side, an outer side, and a wall thickness,
the outer side of the insert (17) is permanently connected over its full surface to the inner side of the dish part (16) within the depression, and
the depression of the dish part has a lower part in the region of the insert (17), wherein a wall thickness of the dish part is reduced by an amount equal to the wall thickness of the insert (17) wherein the inner side of the insert (17) is flush with the inner side of the dish part (18) above the insert (17).

15. The water-collecting bowl according to claim 14, wherein the insert (17) is made of a material that is more resistant to aggressive liquid than the plastic of the dish part (16).

16. A drinking trough for poultry, the drinking trough having at least one drinking valve (13) and a water-collecting bowl (14) assigned to the at least one drinking valve (13), wherein:
the water-collecting bowl (14) is formed from a dish part (16) and at least one insert (17) connected to the dish part (16), the dish part (16) being made of plastic and the insert (17) being made of a material that is more resistant to aggressive liquid than the plastic of the dish part (16);
the dish part (16) comprises an inner side and a depression (18) on the inner side of the dish part (16), the depression (18) having a contour and a lower part, the lower part having a reduced wall thickness; and
the insert (17) having an inner side, an outer side, and a contour that corresponds to the contour of the depression (18), the insert (17) being located within the lower part of the depression (18) wherein the outer side of the insert (17) is permanently connected over its full surface to the depression (18) on the inner side of the dish part (16);
wherein the inner side of the insert (17) is flush with the inner side of the dish part (18) above the insert (17).

* * * * *